(12) United States Patent
Dober (10) Patent No.: US 10,475,558 B2
(45) Date of Patent: Nov. 12, 2019

(54) CABLE PROCESSING EQUIPMENT FOR PROCESSING CABLE CORES OF A MULTI-CORE CABLE

(71) Applicant: Komax Holding AG, Dierikon (CH)

(72) Inventor: Urs Dober, Küssnacht (CH)

(73) Assignee: KOMAX HOLDING AG, Dierikon (CH)

( * ) Notice: Subject to any disclaimer, the term of this patent is extended or adjusted under 35 U.S.C. 154(b) by 140 days.

(21) Appl. No.: 15/168,316

(22) Filed: May 31, 2016

(65) Prior Publication Data

US 2016/0365178 A1 Dec. 15, 2016

(30) Foreign Application Priority Data

Jun. 9, 2015 (EP) .................................. 15171139

(51) Int. Cl.
| | |
|---|---|
| *H01B 13/02* | (2006.01) |
| *H01R 43/28* | (2006.01) |
| *H01R 13/6463* | (2011.01) |
| *H02G 1/12* | (2006.01) |

(52) U.S. Cl.
CPC ......... *H01B 13/0235* (2013.01); *H01R 43/28* (2013.01); *H02G 1/1292* (2013.01); *H01R 13/6463* (2013.01); *H01R 2201/26* (2013.01)

(58) Field of Classification Search
CPC ............... H01R 43/28; Y10T 29/49755; Y10T 29/53091
See application file for complete search history.

(56) References Cited

U.S. PATENT DOCUMENTS

| | | | | |
|---|---|---|---|---|
| 3,891,013 A | | 6/1975 | Folk et al. | |
| 4,183,383 A | * | 1/1980 | Gudmestad | H01R 43/28 140/1 |
| 4,188,702 A | * | 2/1980 | Herbert | H02G 1/1256 29/426.6 |
| 5,692,368 A | * | 12/1997 | Loczenski | D07B 3/005 57/293 |
| 5,896,644 A | * | 4/1999 | Lucenta | H01R 43/28 29/564.4 |
| 6,324,945 B1 | * | 12/2001 | Lo | H01R 9/035 30/90.1 |
| 2003/0199192 A1 | | 10/2003 | Caveney et al. | |

(Continued)

FOREIGN PATENT DOCUMENTS

| | | | |
|---|---|---|---|
| DE | 1540064 | * | 12/1969 |
| DE | 102004004978 A1 | | 8/2004 |

(Continued)

*Primary Examiner* — Minh N Trinh
(74) *Attorney, Agent, or Firm* — William J. Clemens; Shumaker, Loop & Kendrick, LLP (57) ABSTRACT

Cable processing equipment for processing cable cores of a multi-core cable includes separating elements that are introducible between the cable cores and are movable along the cable cores with combing effect. The separating elements are arranged in star shape and are movable in a radial direction relative to the longitudinal axis of the cable. The cable processing equipment further includes a forming tool for preshaping the core ends, which ends are separated by the separating elements, of the cable cores of the multi-core cable. The forming tool includes a forming die with core receptacles for receiving the cable cores and a guide sleeve for embracing the cable cores.

19 Claims, 6 Drawing Sheets

(56) References Cited

U.S. PATENT DOCUMENTS

2014/0115855 A1    5/2014  Angelov et al.
2016/0365178 A1*  12/2016  Dober ................ H01B 13/0235

FOREIGN PATENT DOCUMENTS

| EP | 0748019 | A1 | 12/1996 |
| EP | 1135836 | B1 | 9/2001 |
| EP | 3089294 | * | 4/2015 |
| JP | H0289375 | A | 3/1990 |
| JP | H0289374 | U | 7/1990 |

* cited by examiner

CABLE PROCESSING EQUIPMENT FOR PROCESSING CABLE CORES OF A MULTI-CORE CABLE

FIELD

The invention relates to cable processing equipment for processing cable cores of a multi-core cable. The cable processing equipment is particularly suitable for processing twisted cable cores of a multi-core round cable extending along a cable longitudinal axis.

BACKGROUND

For processing multi-core cables for cable fitting-out it can be necessary to process the cable cores of the cable in such a way that the individual cable cores can thereafter be stripped of insulation in simple manner and, for example, provided with crimp contacts. A hand tool for processing cable cores of a multi-core cable in that way has become known from EP 1 135 836 B1. In order for the multi-core cable to be able to be equipped with a plug housing the cable cores exposed by stripping insulation and folding back the cable screening have to be separated from one another, stripped of insulation and brought into the correct position in correspondence with the entry openings in the plug housing. For that purpose, an apertured template is provided in a lateral region of the hand tool for producing the desired position into which the ends of the cable cores can be manually introduced.

Cable processing equipment for separation of strands of a multi-core cable has become known from DE 10 2004 004 978 B4. This cable processing equipment comprises clamping devices with the help of which the strands can be initially spread apart with use of the clamping action. For further processing of the strands the cable processing equipment additionally comprises a tapered tap, grooves for receiving the strands being let into the outer circumference of the tap. The strands can be fanned out and oriented by turning the tapered tap. For preshaping the strands, an annular slip-on element is moved over the strands and presses the strands into the grooves of the tapered tap. The cable processing equipment is particularly complicated and difficult to operate due to the necessary turning movement. A further disadvantage is that comparatively large circumferential lengths are needed so that strand ends of sufficient length are present.

US 2014/0115855 A shows cable processing equipment and a method in which the cable cores are separated by means of compressed air. In practice, it has proved that the cable cores cannot be brought into a sufficiently defined end position. Consequently, the cable cores have to be reprocessed for later fitting-out.

SUMMARY

It is accordingly an object of the present invention to avoid the disadvantages of the prior art and, in particular, to create cable processing equipment, which can be operated simply and efficiently, for processing cable cores of a multi-core cable. The cable processing equipment shall, in addition, be capable of automation in particularly simple manner.

According to the invention this object is fulfilled by cable processing equipment for processing cable cores of a multi-core cable comprises at least two separating elements which are displaceable relative to one another and introducible between the cable cores and which—after introduction between the cable cores—are movable along the cable cores with combing effect. The cable extending along a cable longitudinal axis can be protected towards the outside by casing insulation surrounding the cable cores. By "processing" there is to be understood here the processing of a multi-core cable, in which the cable cores or the ends thereof are already exposed, at an end, for example by stripping the cable with removal of the casing insulation at the end. The core ends, which are freed of the cable insulation and if need be of the screening (braided screening cover, screening film) of the cable cores are thus processed by the cable processing equipment. The functionality, which is described in detail in the following, of the cable processing equipment as well as the individual method steps carried out on the cable processing equipment consequently relate to the end of the cable with the exposed ends of the cable cores.

When the separating elements are introduced the separating elements penetrate between the cable cores and urge the cable cores apart at least regionally. This advance movement thus leads to separation of the cable cores at a point. For further separation, the penetrated separating elements are moved in the direction of the cable longitudinal axis and, in particular, in the direction of the free end of a cable end. Through this combing process the cable cores are not only separated, but also axially aligned.

Due to the fact that the cable processing equipment comprises at least two separating elements, which are movable towards one another and which for separation of the cable cores lying against one another and optionally twisted are introducible between the preferably exposed ends of the cable cores and movable with combing effect along the cable cores or along the cable longitudinal axis, the cable cores can be processed at the ends in advantageous mode and manner. After the combing process undertaken by means of the separating elements the cable cores are detached from one another and any twisting eliminated, so that the cable cores are present in loose form and stretched to a greater or lesser degree and are ready for possible further processing steps.

The cable processing equipment according to the invention is particularly suitable for processing twisted cable cores of a multi-core cable extending along a cable longitudinal axis. The cable can be a round cable, in which case the cable cores can be circularly bundled. In addition, the circularly bundled cable cores can be arranged to be twisted around a filler. Each cable core can comprise a conductor of an electrically conductive material such as, for example, copper and an insulation encasing the conductor. In addition, the cable can be constructed as a screened cable, in which case the screened cable comprises a braided screening cover of an electrically conductive material and optionally a screening film.

In a first form of embodiment the separating elements can be arranged in star shape around the cable longitudinal axis and movable in radial direction relative to the cable cores or relative to the cable longitudinal axis. The separating elements are preferably so arranged that in a rest setting they are spaced from the cable and do not contact the cable cores. After an advance movement in radial direction the separating element moves between each two adjacent cable cores and produces separation of the cable cores. At the end of the advance movement the separating elements are disposed in an engagement setting. The separating elements movable between the rest setting and engagement setting can be moved by way of drive means acting electrically, pneumatically or in another manner.

A particularly good separation result can be achieved if a respective separating element is provided for each cable core of the multi-core cable to be processed. For example, for a four-core cable the cable processing equipment would accordingly comprise four separating elements. The separating elements can be moved by way of drive means and/or transmission means synchronously from the rest setting to the engagement setting.

The separating elements can be combined in pairs to form separating element pairs, in which the respective separating elements of a separating element pair are connected together in terms of transmission in such a way that after activation of a drive motor or other drive means they are movable in common in opposite sense. The separating elements, which are movable in opposite sense, of a separating element pair are in that case preferably aligned coaxially.

The separating element can be a separating rod with a preferably wedge-shaped tip for penetration between the cable cores and for urging the cable cores apart. The wedge shape of the tip in that case relates to the viewing direction predetermined by the cable longitudinal axis. In order to form the wedge-shaped tip, the separating rod can have flattened wedge flanks tapering towards one another to form a tip. The wedge flanks can include a wedge angle of between 20° and 60°. With particular preference the wedge angle is approximately 40°. The wedge surfaces can advantageously be planar or concave surfaces. As an alternative to the wedge shape, the tip of the separating rod could also be formed as a cone or conical frustum.

If the multi-core cable to be processed has a central filler about which the cable cores are arranged, it can be advantageous if the cable processing equipment has a cutting element for cutting the filler to length. The cutting element can be movable radially relative the filler between an open setting and a cutting setting. The cutting element could comprise a knife with a cutting edge which is, for example, V-shaped. The cutting element is preferably constructed as a cutting die for forming a punching tool.

After the cable cores have been separated and stretched by means of the afore-described separating elements, a further processing step can be advantageous in order to be able to optimally fit-out the respective cable cores. For that purpose the cable processing equipment can comprise a forming tool for preshaping the free core ends of the core ends, which are separated by means of the separating elements, of the cable cores of the multi-core cable. The cable cores (or more precisely the core ends of the cable cores) can be further spaced from one another by the forming tool so that after the end of this processing step they ideally result in core ends extending axially parallelly and arranged at a radial spacing of, for example, 2 millimeters or more from the cable longitudinal axis or from the central filler. Cable cores preshaped in that way can be gripped in simple manner. The individual cable cores can now be stripped of insulation in simple manner and be further fitted out. For example, for housing equipping the cable cores can be provided with contacts or cable end sleeves after the stripping. The stripped ends of the cable cores could, however, also be plugged directly into a plug housing.

The forming tool can comprise a guide sleeve—which is movable in axial direction, i.e. in the direction of the cable longitudinal axis of the multi-core cable, towards the core ends of the cable cores—for embracing the cable cores at the ends.

Additionally or even alternatively to the guide sleeve the forming tool can comprise a forming die, which is movable in axial direction, with channel-like core receptacles for receiving the cable cores at the ends. The cable cores can be shaped by deformation in accordance with the contour predetermined by the core receptacles of the forming die and preshaped in this way in simple manner.

The forming die can have at the free end a spreading section, which tapers to a point, and a preferably cylindrical forming section, which adjoins the spreading section, for predetermining a contour for the core ends of the cable cores. It can be ensured by such a forming die that after the end of the preshaping process mutually spaced-apart and substantially axially parallel core ends of the cable cores of the multi-core cable arise.

If the forming tool comprises the aforesaid forming die and aforesaid guide sleeve it can be advantageous if the forming die and the guide sleeve can be brought into mutual engagement in such a way that the guide sleeve coaxially surrounds the forming die at least in a closed setting and the cable cores are receivable between the guide sleeve and the forming die in the closed setting in clamping manner or at least free of play for plastic shaping of the core ends.

In addition, it can be advantageous if in the closed setting the guide sleeve projects beyond the forming die in axial direction. Moreover, the length of the guide sleeve can advantageously be greater than the length of the forming section of the forming die; with particular preference, the guide sleeve length is greater than the combined lengths of the forming section and the spreading section.

The guide sleeve can comprise a preferably cylindrical pressing section against which the core ends of the cable cores can bear radially outwardly in the closed setting. The pressing section of the guide sleeve can extend to such an extent in axial direction that the core ends, which are to be preshaped or are preshaped, of the cable cores are acted on over the entire length thereof by the forming section.

In addition, the forming die can comprise a central entry opening extending in axial direction, for example in the form of a bore, for receiving a filler of the multi-core cable.

The guide sleeve can have slots extending in axial direction or groove-like cut-outs arranged at the inner side of the guide sleeve, by way of which the cable cores or the core ends of the cable cores can be freed after the preshaping.

In order to free the preshaped core ends the guide sleeve is designed to be rotatable relative to the forming die. The guide sleeve can be rotated about the cable longitudinal axis until the slots or cut-outs are arranged radially above the core receptacles.

The guide sleeve can have a cut-out through which a cutting element for cutting to length the central filler of the multi-core cable can be guided. If the forming tool comprises a forming die, it is advantageous if this forming die similarly has a cut-out for the cutting element.

The afore-described forming tool for preshaping the cable cores of the multi-core cable could be advantageous with other separating means for separating the mutually adjacent and optionally twisted cable cores. The at least two separating elements—which are movable towards one another and introducible between the cable cores and which are movable with combing effect along the cable cores—mentioned in the introduction would not necessarily have to be used in this case.

DESCRIPTION OF THE DRAWINGS

Further individual features and advantages of the invention are evident from the following description of an embodiment and from the drawings, in which.

DETAILED DESCRIPTION

Figure 1:
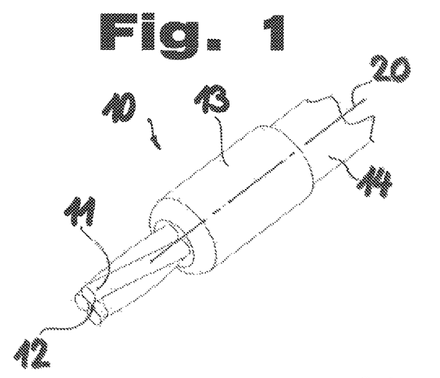
FIG. 1 shows a perspective view of a stripped cable end of a four-core cable with four cable cores.

FIG. 1 shows a cable end of a multi-core cable 10. The present cable 10 is constructed as a round cable and has four cable cores 11, which are arranged to be circularly bundled and twisted about a central filler 12 of circular cross-section. The filler 12, which consists of, for example, an insulating material or textile fibers, substantially predetermines the round or circular configuration of the cable 10 and produces stabilization of the cable. The four-core cable 10 additionally comprises a casing insulation 14 protecting the cable cores 11 towards the outside. For electrical screening the four-core cable 10 has a braided screening cover 13 of an electrically conductive material. In addition, the cable 10 could comprise a screening film (not illustrated) which consists of, for example, a plastics material film to which an aluminum layer is applied. Four-core round cables 10 screened in that way are used as, for example, signal cables in cars or other motor vehicles. The cable cores 11 are illustrated merely symbolically in FIG. 1 as well as in the following figures. The cable cores 11 each comprise a conductor and an insulation, for example, of plastics material, encasing the conductor. The conductors are usually strands or wires of electrically conductive metallic material such as, for example, copper or aluminum.

Figure 2:
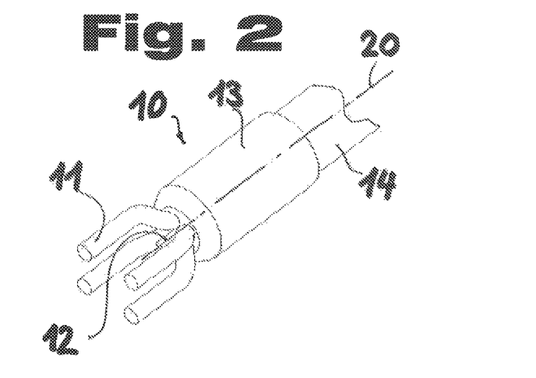
FIG. 2 shows a finished cable end, which starting from the cable end according to FIG. 1 was produced by means of cable processing equipment according to the invention.

Before processing, which is described in detail in the following, of the cable cores 11 by means of the cable processing equipment according to the invention can be commenced the cable cores 11 have to be freed at the end from the casing insulation 14 and from the braided screening cover 13 in a manner known to the expert. The end of the cable 10 illustrated in FIG. 1 is accordingly already stripped and the braided screening cover 13 has been folded over so that the core ends of the cable cores 11 are exposed outwardly. A cable end 10 prepared in that way can now be processed by means of the cable processing equipment described in detail in the following. After the end of the processing procedure by means of the cable processing equipment (again not illustrated here) ultimately a cable 10 as shown in FIG. 2 is present. The individual cable cores 11 are arranged at a mutual spacing and uniformly around the cable longitudinal axis 20. The core ends of the cable cores 11 are in that case oriented axially parallel with respect to the longitudinal center axis 20. The core ends of the cable cores 11 are spaced from the filler 12 by a radial spacing of, for example, at least 2 millimeters. In FIG. 2, the filler 12 is shortened relative to the cable cores 11.

Figure 3:
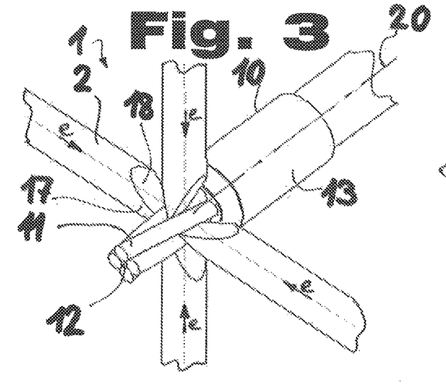
FIG. 3 shows the cable end according to FIG. 1 with separating elements, which penetrate between the cable cores, of the cable processing equipment according to the invention, in an engagement setting.
Figure 4:
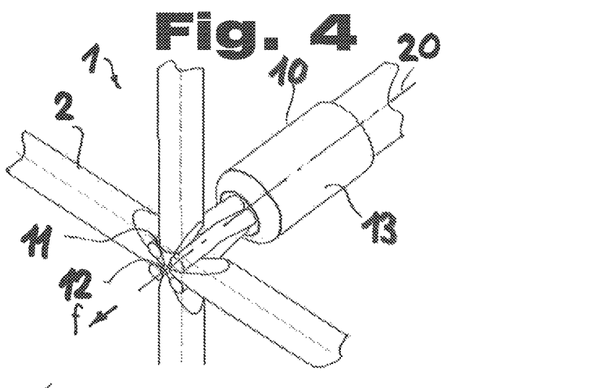
FIG. 4 shows the separating elements during a combing process for stretching the cable cores.

FIGS. 3 and 4 show separating elements 2 of cable processing equipment, by which the twisted cable cores 11 can be separated from one another and aligned. Starting from the prepared cable according to FIG. 1, separating elements 2 are introduced between the cable cores 11. The advance movement for introduction of the separating elements 2 is indicated in FIG. 3 by arrows e. In order that each cable core 11 can be separated, the cable processing equipment 1 comprises four separating elements 2 in a cruciform arrangement. Drive means (not illustrated) are used for the advance movement in radial direction. With particular preference, the separating elements 2 are in that case moved in pairs or all synchronously.

The separating element 2 is in the present case designed, by way of example, as a separating rod with a cylindrical base body. The separating rods 2 have wedge-shaped tips 17 for penetration between the cable cores 11 and for urging apart the adjacent cable cores 11. In order to form the wedge-shaped (with respect to the viewing direction predetermined by the cable longitudinal axis 20) tip 17 the separating element 2 has flattened wedge flanks 18 which taper towards one another to form a tip and which include a wedge angle of, for example, 15°. The front ends of the wedge-shaped tips 17 of the separating elements 2 could contact the filler 12 at the end of the advance movement in radial direction e. Instead of the wedge-shaped tip 17 shown here, the tip of the separating rod 2 could also be formed as a cone or a cone frustum.

After the separating elements 2 have reached the engagement setting (FIG. 3) the separating elements 2 are moved in axial direction. Through movement of the separating elements 2 along the cable cores 11 in the manner of a combing process, the core ends of the cables cores 11 are stretched. The combing process is indicated in FIG. 4 by an arrow f. After the conclusion of the separating and combing process, the end of the cable 10 looks in simplified form like the cable end illustrated in FIG. 5.

Figures 5, 6:
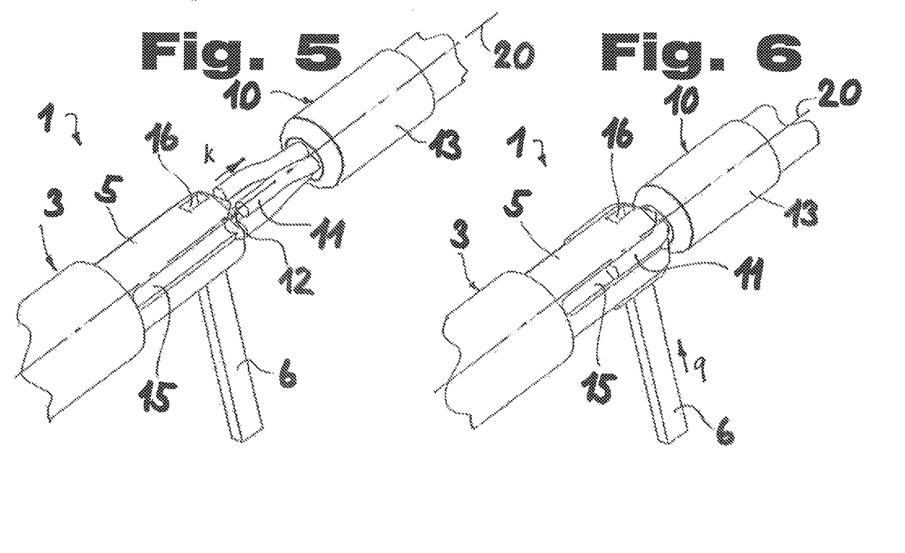
FIG. 5 shows the cable cores of the cable end prior to being acted on by a forming die of a forming tool of the cable processing equipment.
FIG. 6 shows a forming die, which is pushed into the core ends of the cable, of the cable processing equipment according to the invention.

The preshaping process, which is explained on the basis of FIGS. 5 and 6, for preshaping the cable cores 11 can now be carried out. FIG. 5 shows a forming die 5 of a forming tool 3 for preshaping the cable cores 11. The forming die 5 is moved in axial direction towards the cable end of the cable 10 and penetrates into the family of separated and stretched cable cores 11. This movement is indicated by an arrow k. Instead of moving the forming die 5 in axial direction k towards the cable end, the cable 10—if the forming die 5 is stationary—could obviously also be moved in axial direction oppositely to the arrow k. The forming die here has four channel-like core receptacles 15 for the cable cores 11. In FIG. 6 the forming die 5 has penetrated into the cable cores 11. The core ends of the cable cores 11 are disposed in the core receptacles 15 and bear against the contour of the forming die 5. Through deforming the cable cores 11 in accordance with the contour of the forming die 5 the advantageous shaping and positioning of the cable cores 11 illustrated in FIG. 2 arise. In addition, a cutting element 6 by which the filler can be cut to length is provided. The cutting element 6 is moved in q direction for cutting the filler 12 to length. A cut-out through which the cutting element 6 can be guided is denoted by 16. The cutting element 6 is constructed as a cutting die so as to form a punching tool.

If the forming tool 3 were to comprise only a forming die 5, it could happen that on penetration of the forming die 5 into the cable cores 11 the core ends are pressed apart too much and depart from the contour of the forming die 5. In order that the cable cores 11 remain at the contour of the forming die 5 and are thus preshaped in the desired mode and manner the forming tool has a guide sleeve 4 by which a defined deformation of the cable cores 11 can be ensured. The preferred variant of the forming tool 3 for preshaping the cable cores 11 is illustrated in the following FIG. 7.

Figure 7:
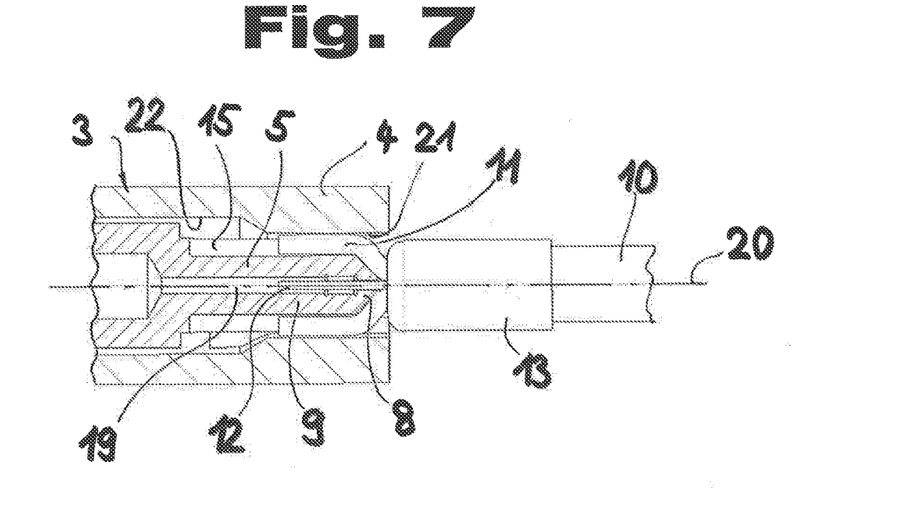
FIG. 7 shows a longitudinal section through a forming tool with a forming die in the setting according to FIG. 6 and with a guide sleeve in a closed setting.

FIG. 7 shows a longitudinal section through a forming tool 3, which has a forming die 5 internally and a guide sleeve 4 externally. The guide sleeve 4 is oriented coaxially with the forming die 5. The guide sleeve 4, which extends along the cable longitudinal axis 20, is mounted to be axially displaceable on the forming die 5. In the closed setting shown in FIG. 7, the forming die 5 and the guide sleeve 4 are brought into interengagement in such a manner that the cable cores 11 are received between the guide sleeve 4 and the forming die 5 under clamping for plastic deformation of the core ends 11.

It is evident from FIG. 7 that the forming die 5 has at the free end a spreading section 8, which tapers to a point, and a cylindrical forming section 9, which adjoins the spreading section, for predetermining the contour for preshaping the cable cores 11. A widened section 22 in the form of a bore adjoins the pressing section 21 at the rear side. The forming die 5 then has an entry opening 19 for receiving the central filler 12 of the cable 10.

Figure 8A:
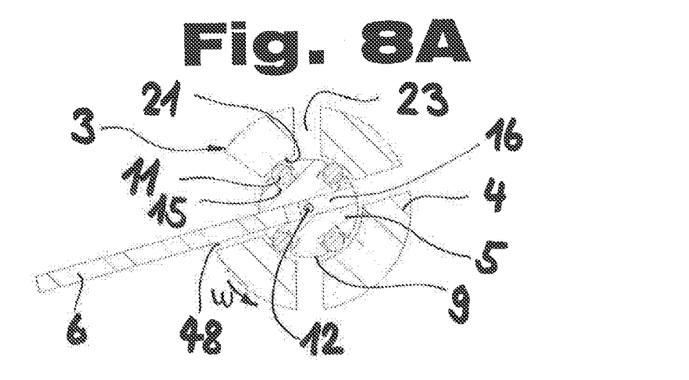
FIG. 8A shows a cross-section through the forming tool of FIG. 7.
Figure 8B:
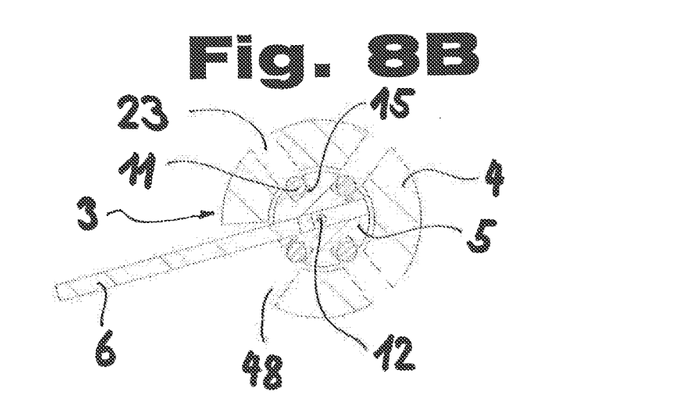
FIG. 8B shows a further cross-sectional illustration of the forming tool, but with turned guide sleeve for releasing the cable cores.

FIG. 8A shows a cross-section through the forming tool 3 in the closed setting. As evident, the cable cores 11 lie in the region of the forming section 9 against the cylindrical inner side 21, which defines the pressing section 21, of the guide sleeve 4 so that the cable cores 11 are deformed as desired for the preshaping. Through turning the guide sleeve in the direction of the arrow w about the longitudinal center axis 20 the slots 23 are brought above the cable cores 11. This setting is illustrated in FIG. 8B. The finished cable end of the cable 10 can now be removed from the forming tool 3. The rotated guide sleeve 4 makes it possible to release the cable without the cable cores 11 being deformed in undesired manner at the time of a withdrawal process. It can additionally be seen in FIGS. 8A and 8B that the cut-out 48 for the passage of the cutting element 6 is widened so as to permit the rotational movement w (FIG. 8A).

The forming tool 3, which is described in FIGS. 5 to 8, for preshaping the cable cores of the multi-core cable 10 could—instead of the arrangement with the separating elements movable radially towards to the cable longitudinal axis—be advantageous with other separating means for separating the mutually adjoining and optionally twisted cable cores. It would be conceivable to separate the cable cores beforehand by means of, for example, compressed air in the manner of the method disclosed in US 2014/0115855 A1.

Figure 9:
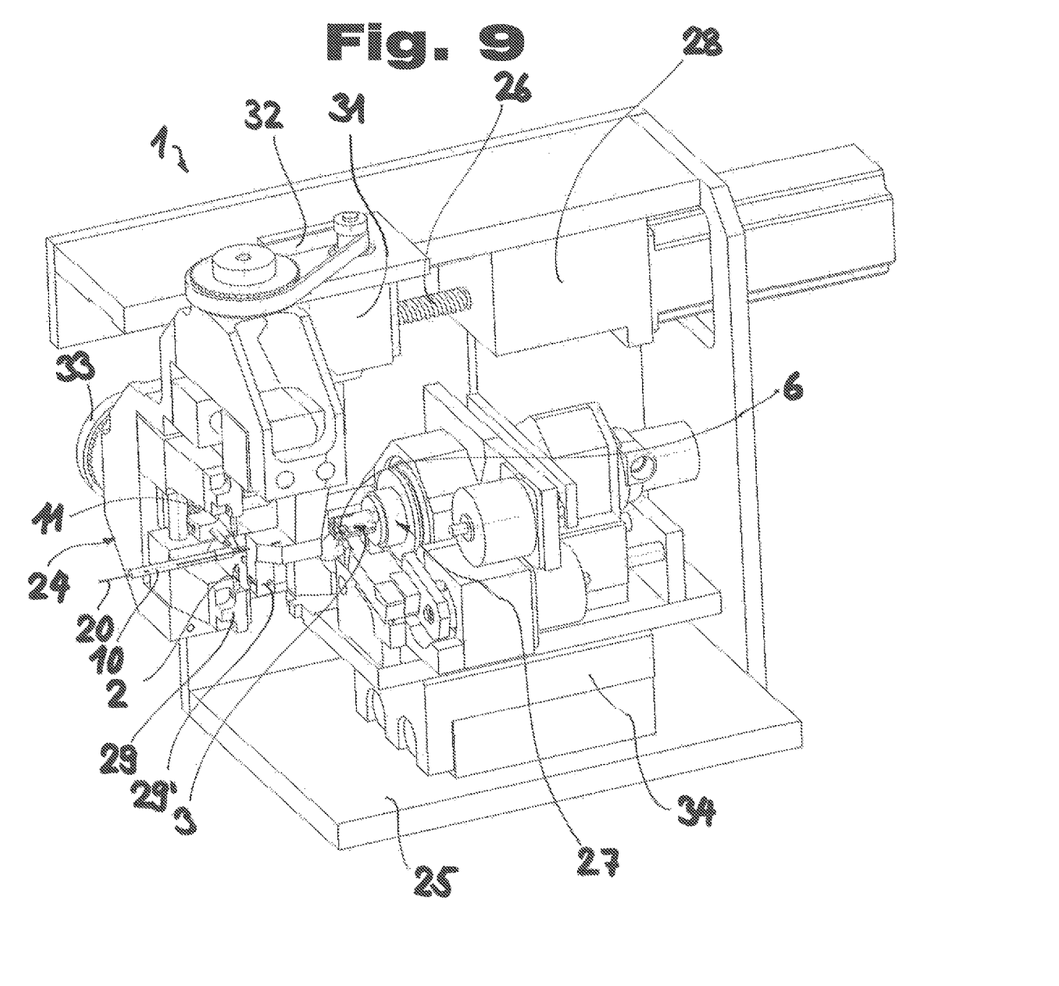
FIG. 9 shows a perspective illustration of cable processing equipment for processing cable cores of a multi-core cable.

Constructional details for the design of cable processing equipment 1 for processing cable cores of a four-cable can be inferred from FIGS. 9 to 12. FIG. 9 shows an overall view of the cable processing equipment 1 with a processing head 24 on which the separating elements 2 are arranged. The processing head 24 is therefore also termed separation and alignment head in the following. The cable longitudinal axis, which is denoted by 20, of the cable 10 provided for processing by the cable processing equipment 1 also predetermines the machine main axis of the cable processing equipment 1. The separation and alignment head 24 is reciprocatingly movable in axial direction along the cable longitudinal axis 20 or along the machine main axis by way of a servo-axle with a spindle drive 28 comprising a spindle 26. The separation and alignment head 24 comprises four separating elements which are movable radially towards the cable cores 11 of the cable 10. The separating elements 2 are of rod-shaped construction and are also termed separating pins in the following. Each separating element 2 is mounted in a pin holder 29. The cable processing equipment 1 comprises a bracket 25 for carrying the machine components.

Each two mutually opposite pin holders 29 for the separating pins are movable in common radially relative to the cable longitudinal axis 20 by way of rack transmissions. An electric drive motor 31 for operating the two horizontally movable pin holders 29, 29' is denoted by 31. The drive motor 31 is connected with one of the rack transmissions by way of a belt 32. The second rack transmission, by which the vertically movable pin holder 29 is movable, is moved by a second drive motor by way of the belt denoted by 33. The two drive motors 31 are advantageously operated in such a way that the separating elements 2 are moved synchronously relative to the cable cores 11.

The cable processing equipment 1 further comprises a processing head 27 termed "preshaping head" in the following. The processing head 27, which carries the forming tool 3 as well as the cutting element 6, can be reciprocatingly moved as a whole in axial direction along the cable longitudinal axis 20 by pneumatic means or other drive means.

Figure 10:
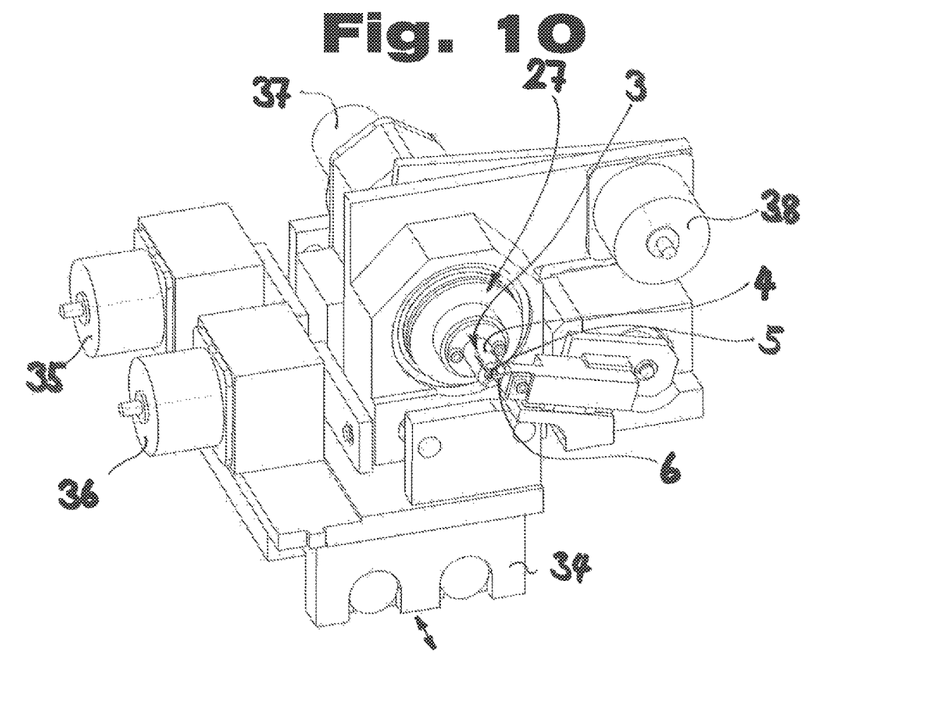
FIG. 10 shows a part of the cable processing equipment of FIG. 9 with a forming tool in a perspective illustration to slightly enlarged scale.

FIG. 10 shows a machine unit of the cable processing equipment 1 with the preshaping head 27. It is indicated by a double arrow in FIG. 12 that the machine unit together with the preshaping head 27 is arranged on a carriage 34 and can be reciprocatingly moved as a whole along the cable longitudinal axis. In total, four drives are provided for operating the individual components of the preshaping head 27. The drive denoted by 35 serves for axial movement of the forming die 5 of the forming tool 3. The guide sleeve 4 can be moved in axial direction by the drive 36. A suction pipe 37 serves for sucking away the filler parts, which are separated by means of the cutting element, of the filler of the cable for removal from the cable processing equipment 1.

Figure 11:
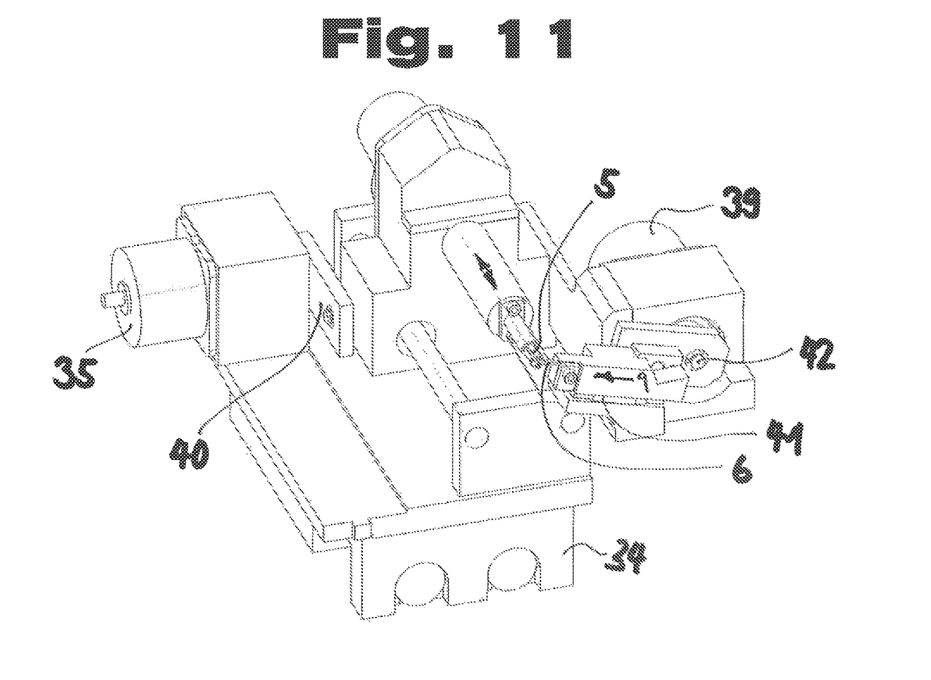
FIG. 11 shows the forming tool according to FIG. 10 with a machine unit containing a forming die.

The arrangement associated with the forming die 5 is illustrated in FIG. 11. The forming die 5 can be reciprocatingly moved in axial direction by the drive 35, which is constructed as, for example, a pneumatic rotary drive, via an eccentric (not visible here) and a connecting rod 40 connected therewith. This movement is indicated in FIG. 11 by a double arrow. In addition, the arrangement illustrated in FIG. 11 comprises a cutting element 6 which is movable by means of a drive 39 in q direction for cutting the filler of the cable to length. The drive solution for operating the cutting element 6 is designed in the present embodiment in similar mode and manner to that for the forming tool. The drive 39 for operating the cutting element 6 is designed as a pneumatic rotary drive which can displace the cutting element 6 in the movement direction q by means of an eccentric 42 connected with the drive axis of the rotary drive.

Figure 12:
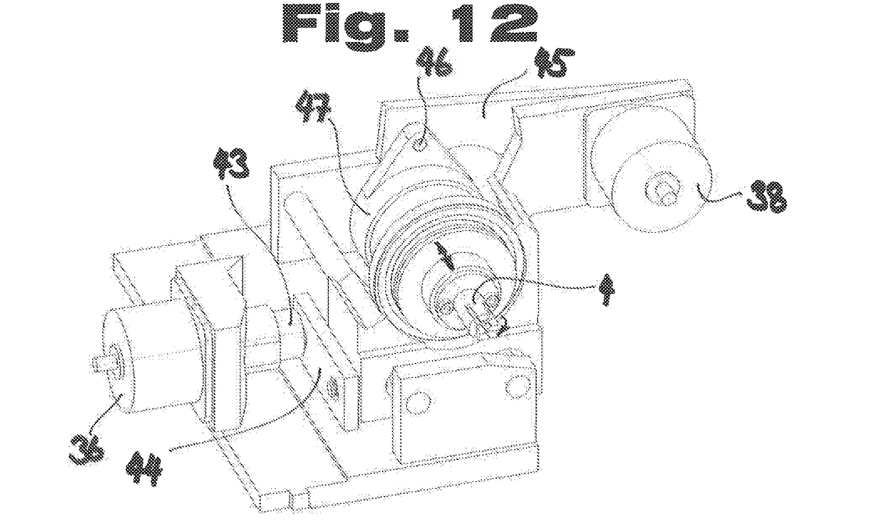
FIG. 12 shows a machine unit containing a guide sleeve for the forming tool according to FIG. 10.

FIG. 12 shows the arrangement associated with the guide sleeve 4. The guide sleeve 4 can be reciprocatingly moved in axial direction by means of a drive 36, which is designed as a pneumatic rotary drive, via an eccentric and a connecting rod 44. The axial mobility of the guide sleeve 4 is indicated in FIG. 12 by a double arrow. Moreover, the guide sleeve 4 can be rotated to limited extent about the cable longitudinal axis or about the machine main axis. This rotational movement is indicated in FIG. 12 by a curved arrow. The drive denoted by 38 serves for rotating the guide sleeve 4. This drive 38 is similarly designed as a pneumatic rotary drive, which is pivotably connected by way of an eccentric as well as a connecting rod 45 with a connecting member 47 to which the guide sleeve 4 is attached. The pivot connection between connecting rod 45 and connecting member 47 is denoted by 46.

Figure 13:
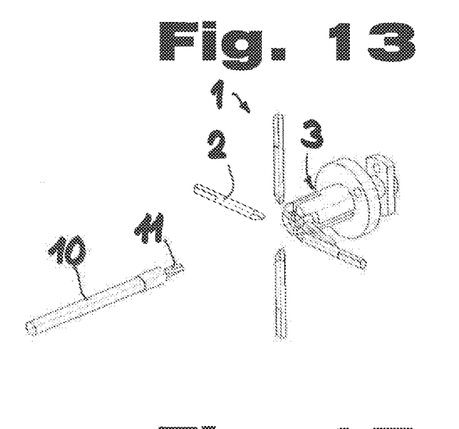
FIG. 13 shows a simplified perspective illustration of the cable processing equipment in a starting setting.
Figure 14:
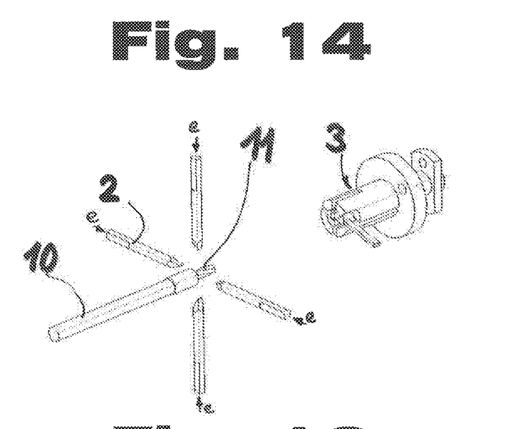
FIG. 14 shows the cable processing equipment according to FIG. 13 with separating elements, which are positioned over cable cores, in a rest setting.
Figure 15:
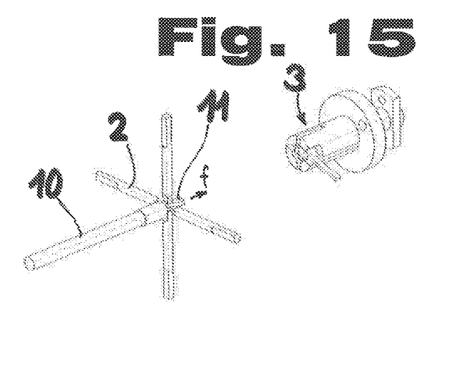
FIG. 15 shows the cable processing equipment with separating elements moved into the cable cores.
Figure 16:
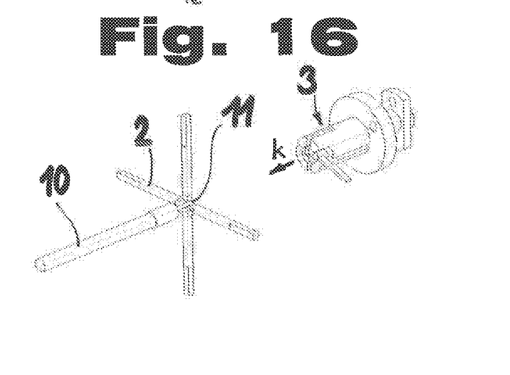
FIG. 16 shows the cable processing equipment after the end of a combing process carried out by means of the separating elements.

The individual working steps of the method for processing the cable cores 11 of the cable 10 with use of the afore-described cable processing equipment 1 are shown by FIGS. 13 to 22. FIG. 13 relates to an initial setting of the cable processing equipment 1. The multi-core cable 10 can be led up to the cable processing equipment 1 by means of a cable gripper (not illustrated) and brought into the correct angular position in correspondence with the alignment of the separating elements 2, whereby the cable end, which is stripped of insulation and freed of the screening cover, with the cable cores 11 is ready. The separating elements 2 disposed in the rest setting are thereafter brought over the cable end of the cable 10 into an axial starting position. This setting is shown in FIG. 14. The separating elements 2 can now be moved in e direction radially towards the cable cores 11. The separating elements 2 penetrate between the cable cores 11 during the advance movement. As soon as the separating elements 2 have reached the engagement setting according to FIG. 15, the separating elements are moved in f direction and the separating elements 2 moved in the manner of a comb along the cable cores 11. In the axial position illustrated in FIG. 15 the front ends of the separating elements 2 do not contact the filler (not recognizable here). Only when the separating elements 2 after conclusion of the combing process have reached the axial end position according to FIG. 16 are the separating elements 2 moved again slightly in radial direction and brought into contact with the filler, whereby the filler is secured and centered in terms of position.

Figure 17:
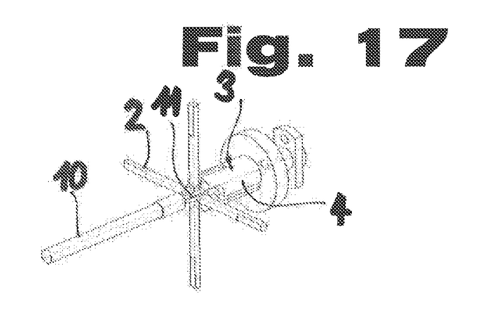
FIG. 17 shows the cable processing equipment with a forming tool guided towards the cable end.
Figure 18:
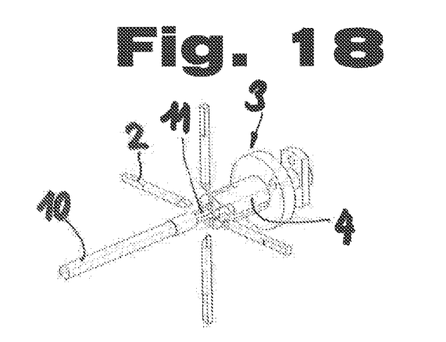
FIG. 18 shows the cable processing equipment after resetting the separating elements into the rest setting.
Figure 19:
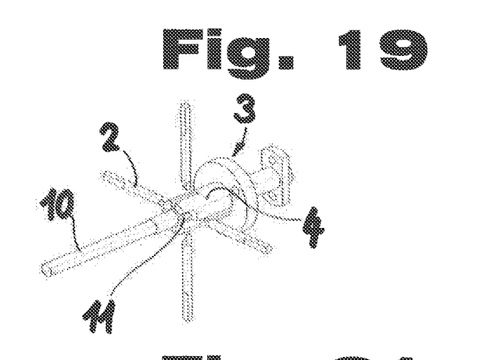
FIG. 19 shows the cable processing equipment with the forming sleeve, which is moved over the cable cores, of the forming tool.
Figure 20:
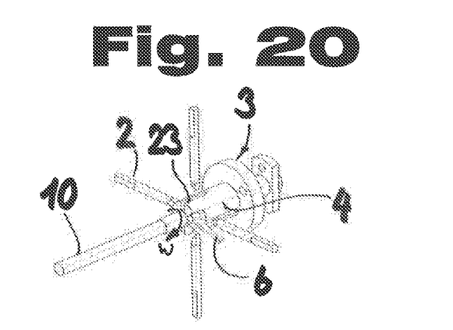
FIG. 20 shows the cable processing equipment after movement out of the forming die in the forming sleeve for producing a closed setting of the forming tool.
Figure 21:
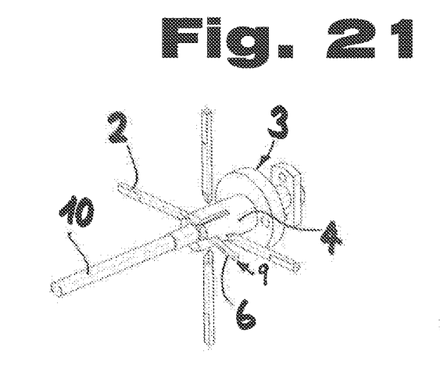
FIG. 21 shows the cable processing equipment after turning of the forming sleeve.
Figure 22:
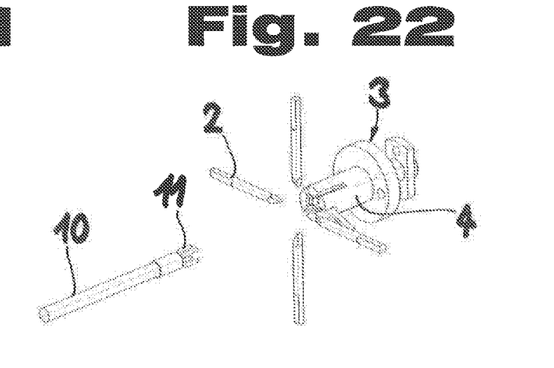
FIG. 22 shows the finished cable end and the cable processing equipment in the starting setting.

Starting from the setting shown in FIG. 16 the forming tool 3 is now moved towards the cable end of the cable 10 in the direction of the arrow k. In that case the filler of the cable 10 is introduced into the entry opening (19, cf. FIG. 7) of the forming die 5 of the forming tool 3. This setting is illustrated in FIG. 17. The separating elements 2 are now moved back in radial direction until they again adopt the rest setting. The cable processing equipment 1 is shown in this setting in FIG. 18. The guide sleeve 4 of the forming tool 3 is thereafter moved in axial direction over the cable cores 11. FIG. 19 shows the cable processing equipment 1 with moved-out guide sleeve 4, in which the cable cores 11 are embraced by the guide sleeve 4. The forming die 5 is thereafter moved out and a closed setting of the forming tool 3 is reached in which the cable cores 11 are shaped. The cable processing equipment 1 with the forming tool 3 in closed setting is shown in FIG. 20. The guide sleeve 4 is now rotated in the direction of the arrow w so as to bring the slots 23 above the cable cores 11. It is thus possible to remove the forming tool from the cable 10 without the preshaped cable cores 11 being loaded during the withdrawal process and thus an undesired post-deformation can be avoided. After rotation of the guide sleeve 4, the forming tool 3 is disposed in the setting according to FIG. 21 in which the filler is cut to length by means of the cutting element 6 moved in q direction. Finally, the cable processing equipment 1 is brought back into its initial setting; the cable end of the cable 10 is now finished. This last setting is shown in FIG. 22.

The afore-described embodiments are directed to end processing of four cable cores of a screened four-core round cable 10. The cable processing equipment 1 according to the invention would obviously also be suitable for other screened or unscreened multi-core round cables and, in particular, for cables with less than or more than four cable cores. Other cable configurations apart from round cables are also conceivable. Moreover, the cable can be furnished with a filler or not furnished with a filler. If, for example, a three-core cable is to be processed by cable processing equipment in the manner described in the preceding then the cable processing equipment would have three separating elements. The forming die of a forming tool would also have to be appropriately designed and would then have three core receptacles for the three cable cores. Correspondingly adapted cable processing equipment could also be advantageous for five-core cables or cables with a higher number of cores.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A cable processing equipment for processing cable cores of a multi-core cable comprising: at least two separating elements that are displaceable towards one another; the separating elements being configured to be introducible between the cable cores by displacement towards one another in a radial direction relative to a longitudinal axis of the cable and the cable cores, and movable thereafter along the longitudinal axis of the cable cores with a combing effect where the separating elements are positioned between the cable cores to separate and stretch the cable cores; said the cable processing equipment further comprising a forming tool for preshaping core ends of the cable cores, the core ends being separated by the separating elements.

2. The cable processing equipment according to claim 1 wherein the separating elements are in a star-shaped arrangement.

3. The cable processing equipment according to claim 1 wherein the separating elements include a respective one of the separating elements for each of the cable cores of the multi-core cable to be processed.

4. The cable processing equipment according to claim 1 wherein each of the separating elements is a separating rod with a tip configured for penetration between the cable cores and for urging the cable cores apart.

5. The cable processing equipment according to claim 1 further comprising a cutting element for cutting a central filler of the multi-core cable to a predetermined length.

6. The cable processing equipment according to claim 1 wherein the forming tool includes a guide sleeve movable in an axial direction along a longitudinal axis of the multi-core cable for embracing core ends of the cable cores.

7. The cable processing equipment according to claim 6 wherein the guide sleeve has slots extending in an axial direction for freeing the embraced preshaped core ends.

8. The cable processing equipment according to claim 6 wherein the forming tool includes a forming die movable in an axial direction along a longitudinal axis of the multi-core cable for receiving the cable cores and the guide sleeve is rotatable relative to the forming die.

9. The cable processing equipment according to claim 1 wherein the forming tool includes a forming die movable in an axial direction along a longitudinal axis of the multi-core cable, the forming die having channel-shaped core receptacles for receiving the cable cores at core ends of the cable cores.

10. The cable processing equipment according to claim 9 wherein the forming die includes a spreading section that tapers to a point, and a cylindrical forming section that adjoins the spreading section for predetermining a contour for the core ends of the cable cores.

11. The cable processing equipment according to claim 9 wherein the forming tool includes a forming die and a guide sleeve that for mutual engagement whereby the guide sleeve coaxially surrounds the forming die in a closed setting and the cable cores are receivable between the guide sleeve and the forming die in the closed setting for plastic shaping of the core ends.

12. The cable processing equipment according to claim 9 wherein the forming die has a central entry opening that extends in the axial direction for receiving a filler of the multi-core cable.

13. A cable processing equipment for processing cable cores of a multi-core cable comprising: at least two separating elements that are displaceable towards one another, said separating elements being configured to be introducible between the cable cores by displacement towards one another in a radial direction relative to a longitudinal axis of the cable and movable thereafter along the cable cores with a combing effect to separate and stretch the cable cores; and a forming tool for preshaping core ends of the cable cores, the core ends being separated by the separating elements.

14. The cable processing equipment according to claim 13 wherein the forming tool includes a guide sleeve movable in an axial direction along a longitudinal axis of the multi-core cable for embracing core ends of the cable cores.

15. The cable processing equipment according to claim 14 wherein the guide sleeve has slots extending in an axial direction for freeing the embraced preshaped core ends.

16. The cable processing equipment according to claim 14 wherein the forming tool includes a forming die movable in an axial direction along a longitudinal axis of the multi-core cable for receiving the cable cores and the guide sleeve is rotatable relative to the forming die.

17. The cable processing equipment according to claim 13 wherein the forming tool includes a forming die movable in an axial direction along a longitudinal axis of the multi-core cable, the forming die having channel-shaped core receptacles for receiving the cable cores at core ends of the cable cores.

18. The cable processing equipment according to claim 17 wherein the forming die includes a spreading section that tapers to a point, and a cylindrical forming section that adjoins the spreading section for predetermining a contour for the core ends of the cable cores.

19. The cable processing equipment according to claim 17 wherein the forming tool includes a forming die and a guide sleeve that for mutual engagement whereby the guide sleeve coaxially surrounds the forming die in a closed setting and the cable cores are receivable between the guide sleeve and the forming die in the closed setting for plastic shaping of the core ends.

* * * * *